(12) United States Patent
Erickson et al.

(10) Patent No.: US 8,191,829 B2
(45) Date of Patent: Jun. 5, 2012

(54) SEAT TRACK ADAPTER

(75) Inventors: Harold G. Erickson, Mukilteo, WA (US); Edward L. Cepurna, Everett, WA (US)

(73) Assignee: The Boeing Company, Chicago, IL (US)

( * ) Notice: Subject to any disclaimer, the term of this patent is extended or adjusted under 35 U.S.C. 154(b) by 790 days.

(21) Appl. No.: 12/269,726

(22) Filed: Nov. 12, 2008

(65) Prior Publication Data

US 2010/0116933 A1 May 13, 2010

(51) Int. Cl.
*B64D 11/00* (2006.01)
(52) U.S. Cl. .................................. 244/118.5
(58) Field of Classification Search ........... 244/118.1, 244/118.6, 122 R, 1 R, 129.1, 131, 137.2
See application file for complete search history.

(56) References Cited

U.S. PATENT DOCUMENTS

| | | | |
|---|---|---|---|
| 3,300,171 A * | 1/1967 | Watts | 410/116 |
| 4,184,433 A * | 1/1980 | Green | 105/327 |
| 6,260,613 B1 * | 7/2001 | Pollard, II | 165/185 |
| 6,260,813 B1 | 7/2001 | Whitcomb | |
| 6,572,304 B1 * | 6/2003 | Hessling et al. | 403/321 |
| 6,863,344 B2 * | 3/2005 | Smallhorn | 297/217.3 |
| 7,370,831 B2 * | 5/2008 | Laib et al. | 244/118.5 |
| 7,389,960 B2 * | 6/2008 | Mitchell et al. | 244/118.5 |
| 7,410,127 B1 * | 8/2008 | Ahad | 244/118.5 |
| 7,713,009 B2 * | 5/2010 | Hudson et al. | 410/105 |
| 7,900,990 B2 * | 3/2011 | Townson | 296/100.16 |

FOREIGN PATENT DOCUMENTS

WO   2006078721 A2   7/2006

* cited by examiner

*Primary Examiner* — Richard Price, Jr.
(74) *Attorney, Agent, or Firm* — Yee & Associates, P.C.

(57) ABSTRACT

An apparatus comprising an elongate planar member, a number of flanges, and a number of channels at ends of the number of flanges. The elongate planar member may have a first side, a second side, and a number of holes. The first side may be opposite to the second side, wherein the first side may be capable of being secured to a track having a substantially planar surface with an array of holes. The number of flanges may extend from the second side of the elongate planar member. Each channel in the number of channels may have a bottom, a first wall, and a second wall. The first wall may have a first lip, and the second wall may have a second lip, wherein the first lip and the second lip may extend towards a centerline of an associated channel in the number of channels.

21 Claims, 11 Drawing Sheets

SEAT TRACK ADAPTER

BACKGROUND INFORMATION

1. Field

The present disclosure relates generally to aircraft and, in particular, to aircraft cabins. Still more particularly, the present disclosure relates to a method and apparatus for attaching structures to the floor of a cabin in an aircraft.

2. Background

An aircraft cabin may be a portion of an aircraft that passengers may occupy during flight. An aircraft cabin may also be referred to just as a cabin or a passenger cabin. An aircraft cabin may have various sections. For example, without limitation, an aircraft cabin may have a passenger area, a galley, storage areas, lavatories, and other suitable areas.

Within the passenger area, seats may be arranged in rows and aisles. These seats may be attached to the floor structure of the aircraft through tracks. These tracks may have a C-shaped channel.

Attachment systems at the bottom of the seats may be secured to the tracks to secure the seats to the floor structure. Closets, lavatory walls, cabinets, and other monuments may be secured to the floor structure of the aircraft within the cabin in a similar fashion.

The use of seat tracks also may allow flexibility in reconfiguring the cabin. For example, without limitation, the pitch and/or distance between rows of seats may be adjusted by moving the seats along the rails in the floor of the passenger cabin during maintenance and service of the aircraft. In a similar fashion, newer seats may replace older seats by removing the older seats from the rails and securing the newer seats to the rails. Also, closets, lavatories, and other monuments may be removed, reconfigured, and/or moved in the passenger cabin during maintenance and/or service.

Although many passenger cabins employ tracks with C-shaped channels, some aircraft may employ different types of tracks. With different tracks, seats and other monuments may require a different type of attachment system to secure those structures to the tracks. Offering different types of attachment systems may increase the cost to manufacturers of those structures.

Further, in some cases, the manufacturers of seats and/or different types of monuments may be unwilling to and/or unable to manufacture seats and/or other monuments with the needed attachment systems. This situation may result in having fewer choices in selecting seats and/or monuments for a passenger cabin. In some cases, some types of seats and/or monuments may be unavailable for the passenger cabin, because these structures may not have the attachment system needed for a particular type of track.

Therefore, it would be advantageous to have a method and apparatus to overcome the issues described above.

SUMMARY

In one advantageous embodiment, an apparatus may comprise an elongate planar member, a number of flanges, and a number of channels at ends of the number of flanges. The elongate planar member may have a first side, a second side, and a number of holes. The first side may be opposite to the second side, wherein the first side may be capable of being secured to a track having a substantially planar surface with an array of holes. The number of flanges may extend from the second side of the elongate planar member. Each channel in the number of channels may have a bottom, a first wall, and a second wall. The first wall may have a first lip, and the second wall may have a second lip. The first lip and the second lip may extend towards a centerline of an associated channel in the number of channels.

In another advantageous embodiment, an adaptor system may be present for attaching structures to a floor of a cabin. An elongate planar member may have a first side, a second side, and a number of holes. The first side may be opposite to the second side, wherein the first side may be capable of being secured to a track having a substantially planar surface with an array of holes. The elongate planar member may be manufactured from a material selected from one of steel, aluminum, titanium, and a composite material. A number of flanges may extend from the second side of the elongate planar member. A number of channels may be at ends of the number of flanges. Each channel in the number of channels may have a bottom, a first wall, a second wall, and a C shape. The first wall may have a first lip, and the second wall may have a second lip. The first lip and the second lip may extend towards a centerline of an associated channel in the number of channels. A centerline of the elongate planar member may be offset and substantially parallel to a centerline of the number of channels. A structure may have an attachment system capable of being secured to at least a portion of the number of channels. The structure may be selected from one of a seat and a monument. The monument may be selected from one of a closet, a dog house, and a lavatory. The attachment system may include a latch system capable of being connected to the structure and to at least a portion of the number of channels. The track may be capable of being secured to a floor structure in the cabin. A number of fasteners may secure the elongate planar member to the track using the number of holes and the array of holes.

In yet another advantageous embodiment, a method may be present for installing a structure. An adapter may be attached to a track having an array of holes, wherein the adaptor may comprise an elongate planar member having a first side, a second side, and a number of holes. The first side may be opposite to the second side, wherein the first side may be capable of being secured to the track having a substantially planar surface with the array of holes. A number of flanges may extend from the second side of the elongate planar member. A number of channels may be present at ends of the number of flanges. Each channel in the number of channels may have a bottom, a first wall, and a second wall. The first wall may have a first lip, and the second wall may have a second lip. The first lip and the second lip may extend towards a centerline of an associated channel in the number of channels. An attachment system for the structure may be secured to the number of channels for the adapter.

In a further advantageous embodiment, a method may be for installing a structure in an aircraft cabin. An adapter may be attached to a track having an array of holes. The adapter may comprise an elongate planar member having a first side, a second side, and a number of holes. The first side may be opposite to the second side, wherein the first side may be capable of being secured to the track having a substantially planar surface with the array of holes. A number of flanges may extend from the second side of the elongate planar member. A number of channels may be present at ends of the number of flanges, wherein each channel in the number of channels may have a bottom, a first wall, and a second wall. The first wall may have a first lip, and the second wall may have a second lip. The first lip and the second lip may extend towards a centerline of an associated channel in the number of channels. The track may be capable of being secured to a floor structure in the aircraft cabin. An attachment system for the structure may be secured to the number of channels for the adapter. The structure may be selected from one of a seat and a monument. The attachment system may comprise a latch system capable of being connected to the aircraft structure and to at least a portion of the number of channels.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
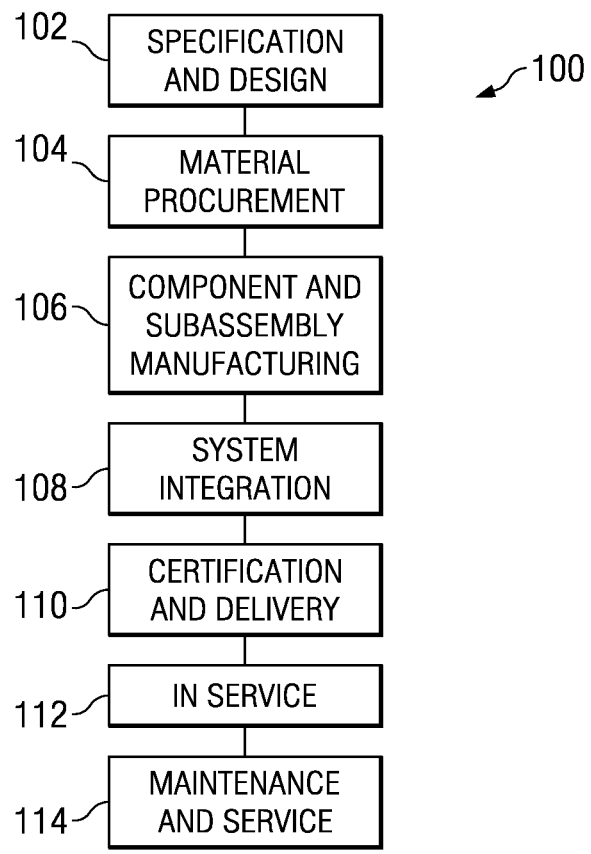
FIG. 1 is a diagram illustrating an aircraft manufacturing and service method in accordance with an advantageous embodiment.
Figure 2:
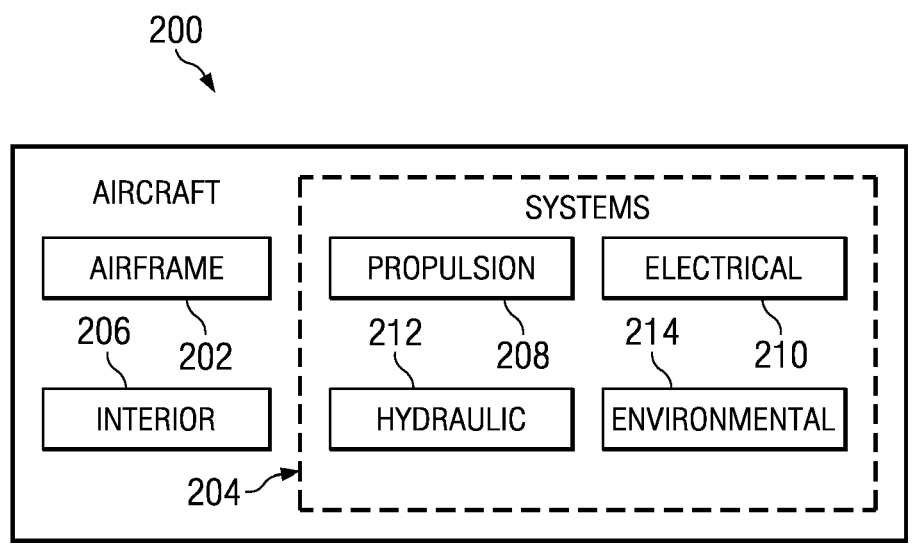
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include, without limitation, one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that current track systems for aircraft cabins employ tracks that have C-shaped channels. Further, the different advantageous embodiments take into account and recognize that current attachment systems for structures such as, for example, without limitation, seats and monuments may be specifically designed for these types of tracks. The different advantageous embodiments also recognize and take into account that manufacturers of these and other suitable structures may be unable to and/or unwilling to manufacture structures with a different type of attachment system.

Therefore, the different advantageous embodiments may provide a method and apparatus for attaching structures to tracks. An apparatus may have an elongate planar member having a first side, a second side, and a number of holes. The first side may be capable of being secured to a track having a substantially planar surface with an array of holes. A number of flanges may extend from the second side of the elongate planar member.

A number of channels may be present at the ends of the number of flanges. Each channel in the number of channels has a bottom, a first wall, and a second wall. The first wall has a first lip, and the second wall has a second lip. The first lip and the second lip may extend towards a centerline of an associated channel in the number of channels. The structure may also be referred to as C-shaped. As used herein, a number of items may refer to one or more items. For example, without limitation, a number of holes may be one or more holes.

Figure 3:
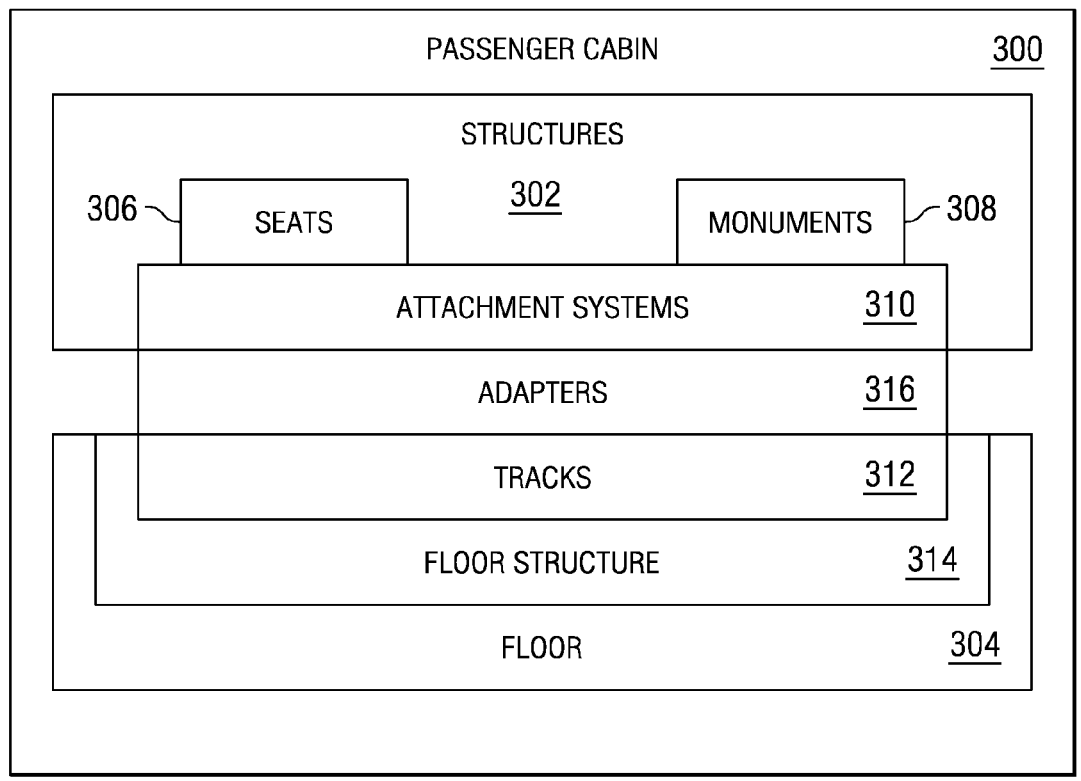
FIG. 3 is a diagram illustrating a passenger cabin in accordance with an advantageous embodiment.

With reference now to FIG. 3, a diagram illustrating a passenger cabin is depicted in accordance with an advantageous embodiment. Passenger cabin 300 may be an example of a passenger cabin that may be found in interior 206 of aircraft 200 in FIG. 2.

Passenger cabin 300 may have structures 302 attached to floor 304 within passenger cabin 300. Structures 302 may include various structures such as, for example, without limitation, seats 306, monuments 308, and other suitable structures. Monuments 308 may include, for example, without limitation, closets, lavatories, tables, cabinets, and other suitable structures that may be attached to floor 304 of passenger cabin 300.

Structures 302 may be attached to floor 304 through attachment systems 310 that may be part of structures 302. Attachment systems 310 may be secured to tracks 312 located in floor structure 314.

In the different advantageous embodiments, attachment systems 310 may not be compatible with tracks 312. As a result, adapters 316 may be employed. For example, without limitation, adapters 316 may attach to attachment systems 310. Adapters 316 also may attach to tracks 312. In this manner, structures 302 may be manufactured without requiring different types of attachment systems 310 for attachment to floor 304.

The illustration of passenger cabin 300 in FIG. 3 is not meant to imply physical or architectural limitations to the manner in which a passenger cabin may be implemented. In some advantageous embodiments, passenger cabin 300 may include other components in addition to or in place of the ones depicted. Further, some components illustrated in passenger cabin 300 may be unnecessary.

Figure 4:
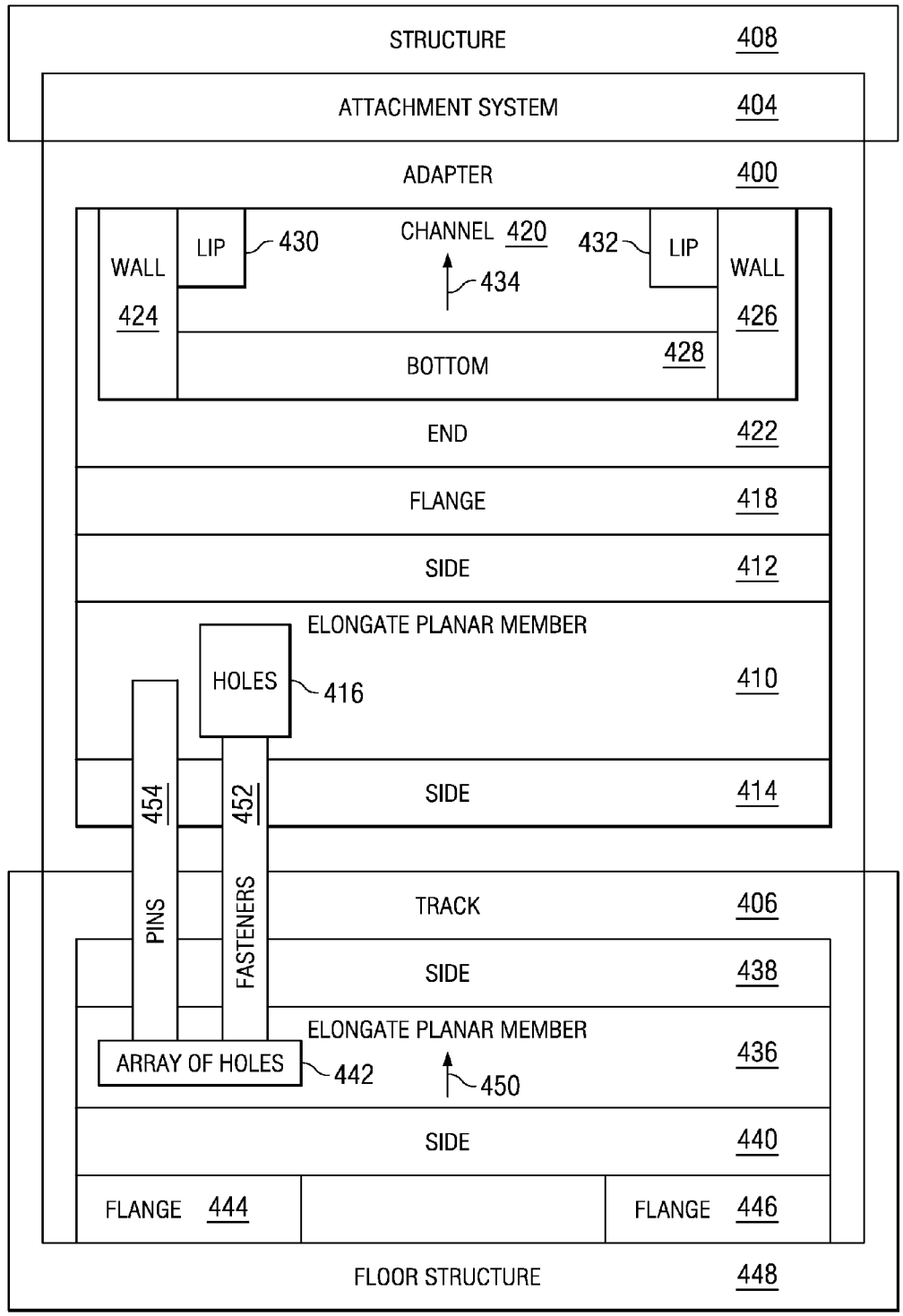
FIG. 4 is a diagram illustrating an attachment apparatus in accordance with an advantageous embodiment.

With reference now to FIG. 4, a diagram illustrating an attachment apparatus is depicted in accordance with an advantageous embodiment. In this example, adapter 400 may be secured to attachment system 404 and track 406 in a manner that secures structure 408 to track 406.

In this illustrative example, adapter 400 may be an example of an adapter in adapters 316 in FIG. 3. Attachment system 404 may be an example of an attachment system within attachment systems 310 in FIG. 3. Track 406 may be a track within tracks 312 in FIG. 3.

In this illustrative example, adapter 400 may have elongate planar member 410 with side 412 and side 414. Side 412 may be opposite side 414 on elongate planar member 410. Further, elongate planar member 410 may have holes 416. Holes 416 may extend at least partially through elongate planar member 410 and/or side 412 and/or side 414.

Flange 418 may extend from side 412 of elongate planar member 410. Flange 418 may have channel 420 at end 422. Channel 420 may have wall 424, wall 426, and bottom 428. Wall 424 may have lip 430, and wall 426 may have lip 432. This configuration for channel 420 may also be referred to as a C shape. Lip 430 and lip 432 may extend over bottom 428. Lip 430 and lip 432 may extend inward toward centerline 434 of channel 420. Channel 420 in flange 418 may be adapted to receive attachment system 404 for structure 408. Elongate planar member 410 may be manufactured from a material selected from one of steel, aluminum, titanium, a composite material, and/or some other suitable material.

Track 406 may comprise elongate planar member 436, which may have side 438 and side 440. Elongate planar member 436 also may have array of holes 442 which may extend at least partially through side 438 and/or side 440.

Additionally, elongate planar member 436 may have flange 444 and flange 446, which may extend from side 440 of elongate planar member 436. Flange 444 and flange 446 may be attached to floor structure 448. Side 438 of elongate planar member 436 may contact side 414 of elongate planar member 410. One or more of holes 416 may be aligned to one or more of array of holes 442.

In these examples, array of holes 442 may be aligned to centerline 450 of elongate planar member 436. Elongate planar member 410 may be secured to elongate planar member 436 through fasteners 452 being placed through holes 416 and array of holes 442 and physically securing elongate planar member 410 and elongate planar member 436. Pin 454 may be present on side 414 of elongate planar member 410. Pin 454 may be placed into array of holes 442 to help secure elongate planar member 410 to elongate planar member 436 along with or instead of fasteners 452.

The illustration of adapter 400, attachment system 404, and track 406 in FIG. 4 are not meant to imply physical or architectural limitations to the manner in which these components may be implemented. In some advantageous embodiments, other components in addition to or in place of the ones illustrated may be employed. For example, without limitation, adapter 400 may include additional flanges in addition to flange 418. These additional flanges may be arranged serially and/or in an array along elongate planar member 410.

In yet other advantageous embodiments, another flange in addition to flange 418 may be located at least substantially parallel to flange 418 along centerline 434. In yet other advantageous embodiments, adapter 400 may include additional flanges depending on the particular implementation. Further, additional flanges also may include additional channels capable of receiving attachment systems, such as attachment system 404.

Figure 5:
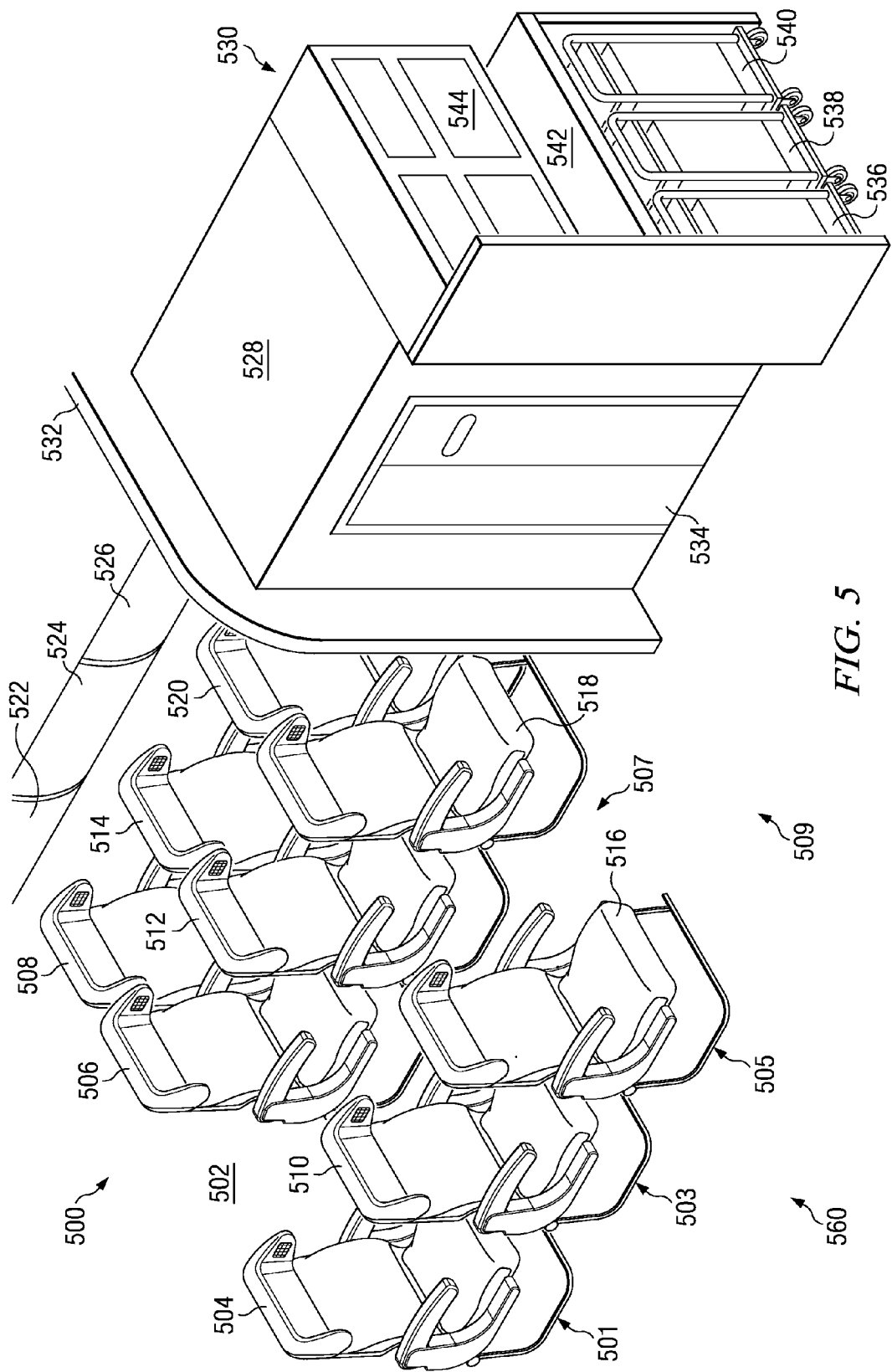
FIG. 5 is an illustration of a portion of a passenger cabin in accordance with an advantageous embodiment.

With reference now to FIG. 5, an illustration of a portion of a passenger cabin is depicted in accordance with an advantageous embodiment. Passenger cabin 500 may be an example of one implementation for passenger cabin 300 in FIG. 3. In this example, passenger cabin 500 may be an example of a seating area that may be present in interior 206 of aircraft 200. Passenger cabin 500 may include passenger seating in seating area 502. Passenger seating may include aircraft seats 504, 506, 508, 510, 512, 514, 516, 518, and 520. These seats are arranged to form rows 501, 503, and 505 in passenger cabin 500. The arrangement of these seats also forms aisle 507 and open space 509.

Further, seating area 502 in passenger cabin 500 may also include storage areas, such as overhead compartments 522, 524, and 526. Passenger cabin 500 also may include lavatory 528 and galley area 530. These two areas may be partitioned or separated from seating area 502 by a partitioning structure such as, for example, without limitation, wall 532. Lavatory 528 may have door 534, which allows entry into lavatory 528. Further, galley area 530 may include carts 536, 538, and 540, which may be stored under counter 542. Further, galley area 530 also may include cabinets 544. Cabinets 544 may store various items, such as, for example, without limitation, drinks, tableware, plates, cups, napkins, coffee, and other suitable items for galley area 530.

The different advantageous embodiments may be used to attach structures in passenger cabin 500 to floor 560. These structures include, for example, without limitation, aircraft seats 504-520, wall 532, cabinets 544, and/or other suitable monuments or structures. In other examples, the different advantageous embodiments may be used to make changes to passenger cabin 500. These changes may include, for example, without limitation, adding a seat in front of row 505 in open space 509.

This illustration of passenger cabin 500 for an aircraft may be provided for purposes of illustrating one environment in which the different advantageous embodiments may be implemented. The illustration of passenger cabin 500 in FIG. 5 is not meant to imply architectural limitations as to the manner in which different advantageous embodiments may be implemented.

For example, without limitation, other areas may be present in addition to passenger seating area 502, lavatory 528, and galley area 530. Other areas may include, for example, without limitation, closets, storage areas, lounges, and other suitable areas for passenger seating. As another example, aircraft seats within seating area 502 may be arranged differently from the depicted example.

Figure 6:
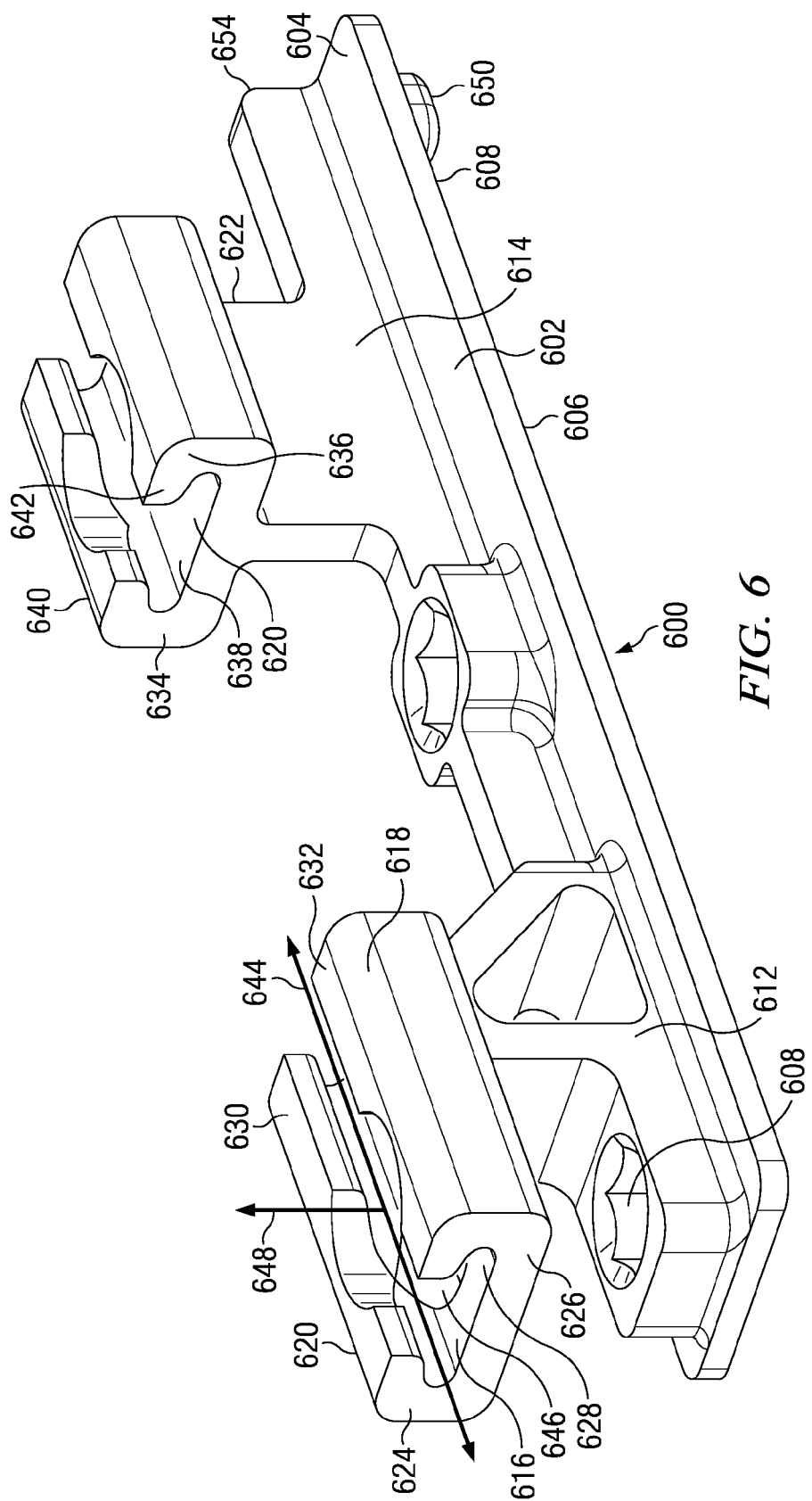
FIG. 6 is a perspective view of an adapter in accordance with an advantageous embodiment.

With reference now to FIG. 6, a perspective view of an adapter is depicted in accordance with an advantageous embodiment. Adapter 600 may be an example of one implementation of adapter 400 in FIG. 4.

In this example, adapter 600 may comprise elongate planar member 602, which may have side 604 and side 606. In this example, elongate planar member 602 may have hole 608 and hole 610. In this example, flange 612 and flange 614 may extend from side 604. Channel 616 may be located at end 618 of flange 612, while channel 620 may be located at end 622 of flange 614. Channel 616 may have wall 624, wall 626, and bottom 628. Wall 624 may have lip 630, while wall 626 may have lip 632.

Channel 620 may have wall 634, wall 636, and bottom 638. Wall 634 may have lip 640, while wall 636 may have lip 642. In these examples, lip 630, lip 632, lip 640, and lip 642 extend inwards in channels 616 and 620 towards centerline 644.

In these advantageous embodiments, hole 608 and hole 610 also may extend through a portion of flanges 612 and 614, respectively. Also, as can be seen in this illustrative example, channel 616 may have hole 646, which may be aligned with hole 608 along axis 648. Adapter 600 also may have pin 650, which may be located on side 606 of elongate planar member 602 at end 654 of adapter 600. Pin 650 may be one example of pin 454 in FIG. 4.

Figure 7:
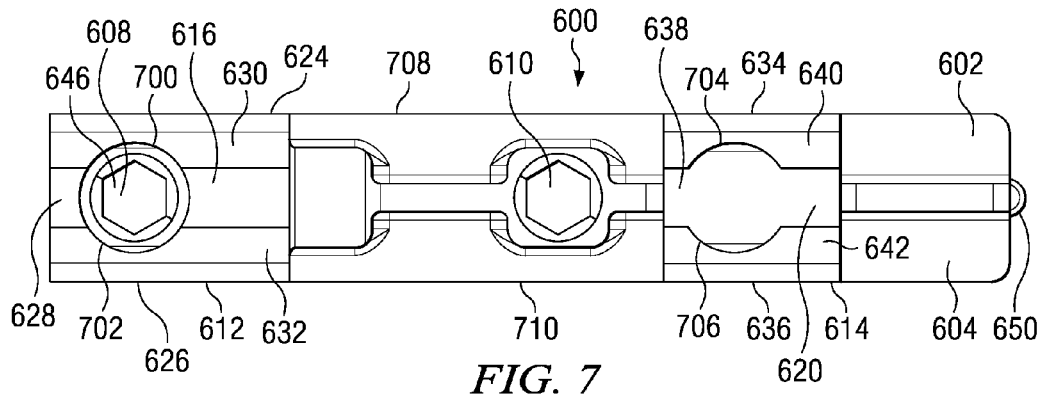
FIG. 7 is a top view of an adapter in accordance with an advantageous embodiment.

With reference now to FIG. 7, a top view of adapter 600 is illustrated in accordance with an advantageous embodiment. In this view, curved section 700, 702, 704, and 706 may be present in lips 630, 632, 640, and 642, respectively. In this example, curved section 700 and curved section 704 may be located on side 708 of adapter 600. Curved section 702 and curved section 706 may be located on side 710 of adapter 600.

Figure 8:
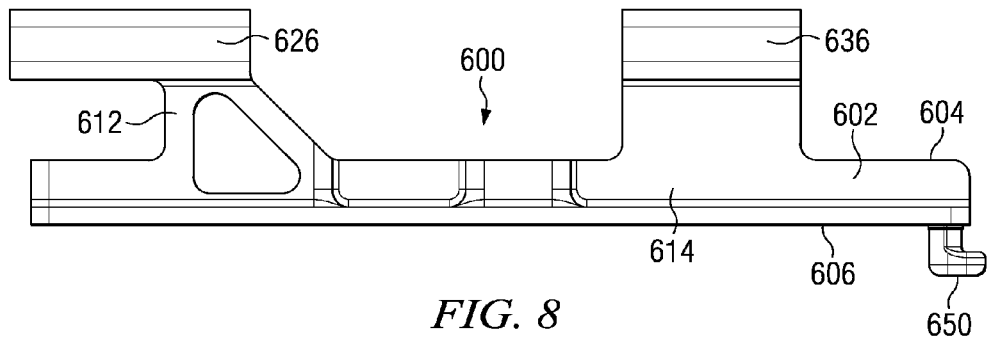
FIG. 8 is a diagram illustrating a side view of an adapter in accordance with an advantageous embodiment.
Figure 9:
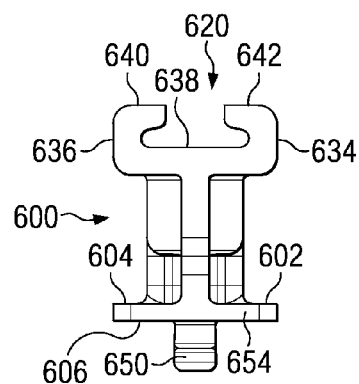
FIG. 9 is an end view of an adapter in accordance with an advantageous embodiment.

With reference now to FIG. 8, a diagram illustrating a side view of adapter 600 is depicted in accordance with an advantageous embodiment. In this illustrative example, a side view of side 710 for adapter 600 may be seen. In FIG. 9, an end view of adapter 600 is depicted in accordance with an advantageous embodiment. In this depicted example, end 654 of adapter 600 may be seen.

Figure 10:
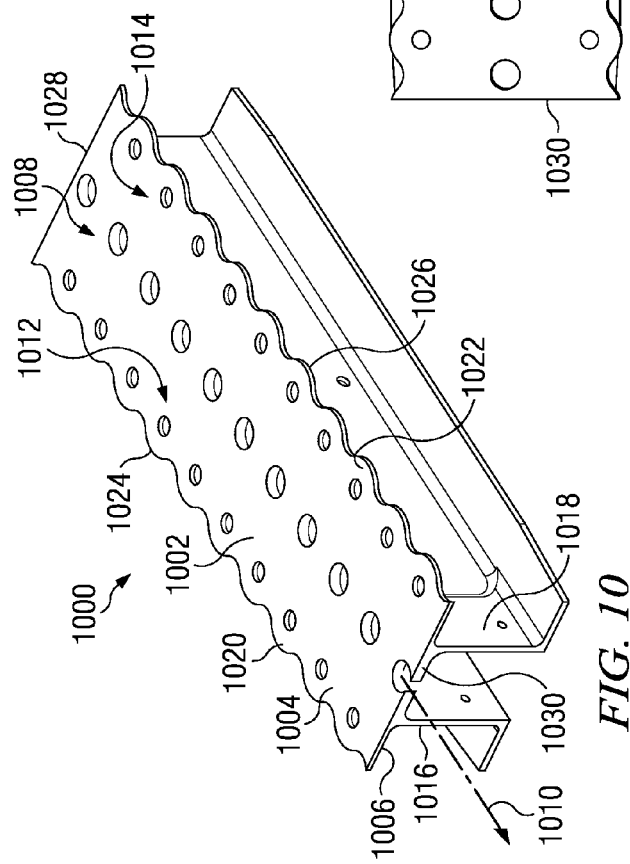
FIG. 10 is a perspective view of a track in accordance with an advantageous embodiment.

With reference now to FIG. 10, a perspective view of a track is depicted in accordance with an advantageous embodiment. In this example, track 1000 may have elongate planar member 1002. Elongate planar member 1002 may have side 1004 and side 1006. Side 1004 may be opposite of side 1006. Further, array of holes 1008 may be present in elongate planar member 1002 extending from side 1004 to side 1006. In this example, array of holes 1008 may be aligned along centerline 1010 of elongate planar member 1002.

Elongate planar member 1002 also may include array of holes 1012 and array of holes 1014. Array of holes 1012 and array of holes 1014 may be aligned substantially parallel to centerline 1010. Flange 1016 and flange 1018 may extend from side 1006. Side 1020 and side 1022 of elongate planar member 1002 may have curved surface 1024 and curved surface 1026, respectively. End 1028 and end 1030 of elongate planar member 1002 may be substantially straight in these examples.

Figure 11:
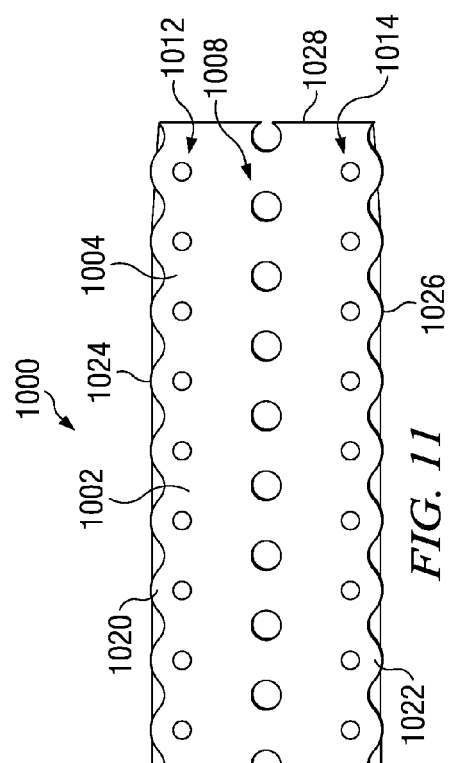
FIG. 11 is a top view of a track in accordance with an advantageous embodiment.
Figure 13:
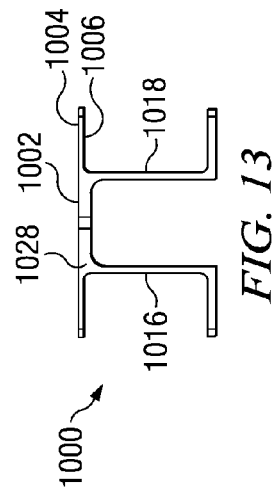
FIG. 13 is an end view of a track in accordance with an advantageous embodiment.
Figure 12:
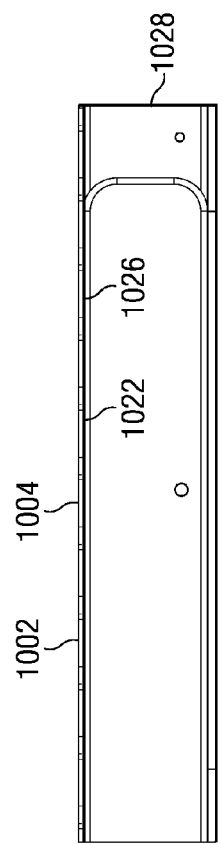
FIG. 12 is a side view of a track in accordance with an advantageous embodiment.

With reference now to FIG. 11, a top view of track 1000 is depicted in accordance with an advantageous embodiment. Side 1004 may be seen from a top view. In FIG. 12, a side view of a track is depicted in accordance with an advantageous embodiment. Track 1000 may be seen from a side view of side 1022 in FIG. 10. Next, in FIG. 13, an end view of a track is depicted in accordance with an advantageous embodiment. Track 1000 may be seen from a view of end 1028.

Figure 14:
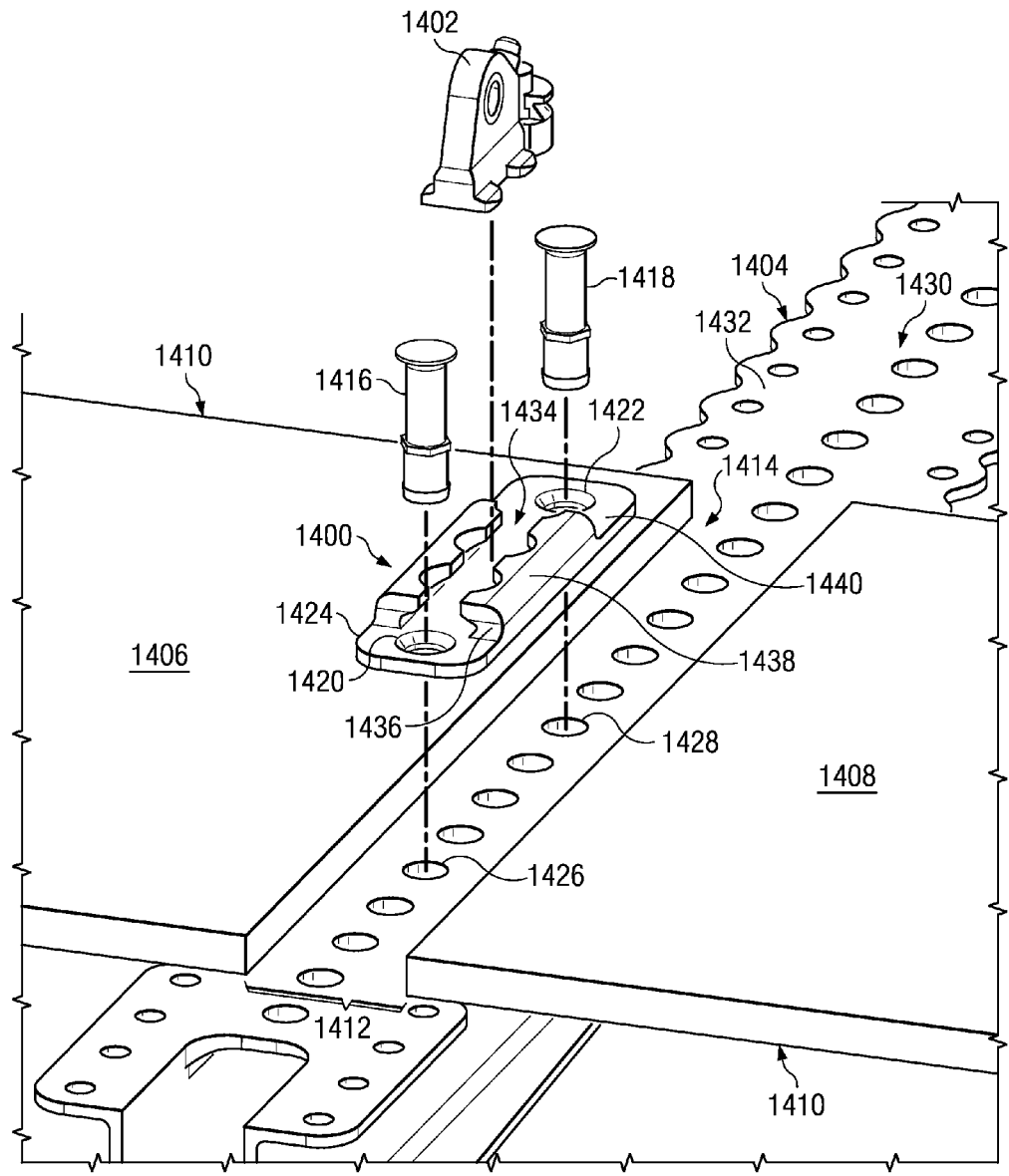
FIG. 14 is an exploded perspective view of a track, an adapter, and an attachment system in accordance with an advantageous embodiment.

With reference now to FIG. 14, an exploded perspective view of a track, an adapter, and an attachment system is depicted in accordance with an advantageous embodiment. In this illustrative example, adapter 1400 may be another example of an implementation of adapter 400 in FIG. 4.

Adapter 1400 may be used to secure attachment system 1402 to track 1404. Floor panel 1406 and floor panel 1408 may be a portion of floor 1410 in a passenger cabin such as, for example, without limitation, passenger cabin 500 in FIG. 5. The positioning of floor panel 1406 and floor panel 1408 may have gap 1412 for channel 1414. Adapter 1400 may be secured to track 1404 in channel 1414 using fasteners 1416 and 1418.

As can be seen in these examples, fasteners 1416 and 1418 may be placed through holes 1420 and 1422 in elongate planar member 1424 of adapter 1400 and through holes 1426 and 1428 in array of holes 1430 for elongate planar member 1432 of track 1404. In this illustrative example, attachment system 1402 may be placed into channel 1434 located at end 1436 of flange 1438, which may extend from side 1440 of elongate planar member 1424 for adapter 1400.

Figure 15:
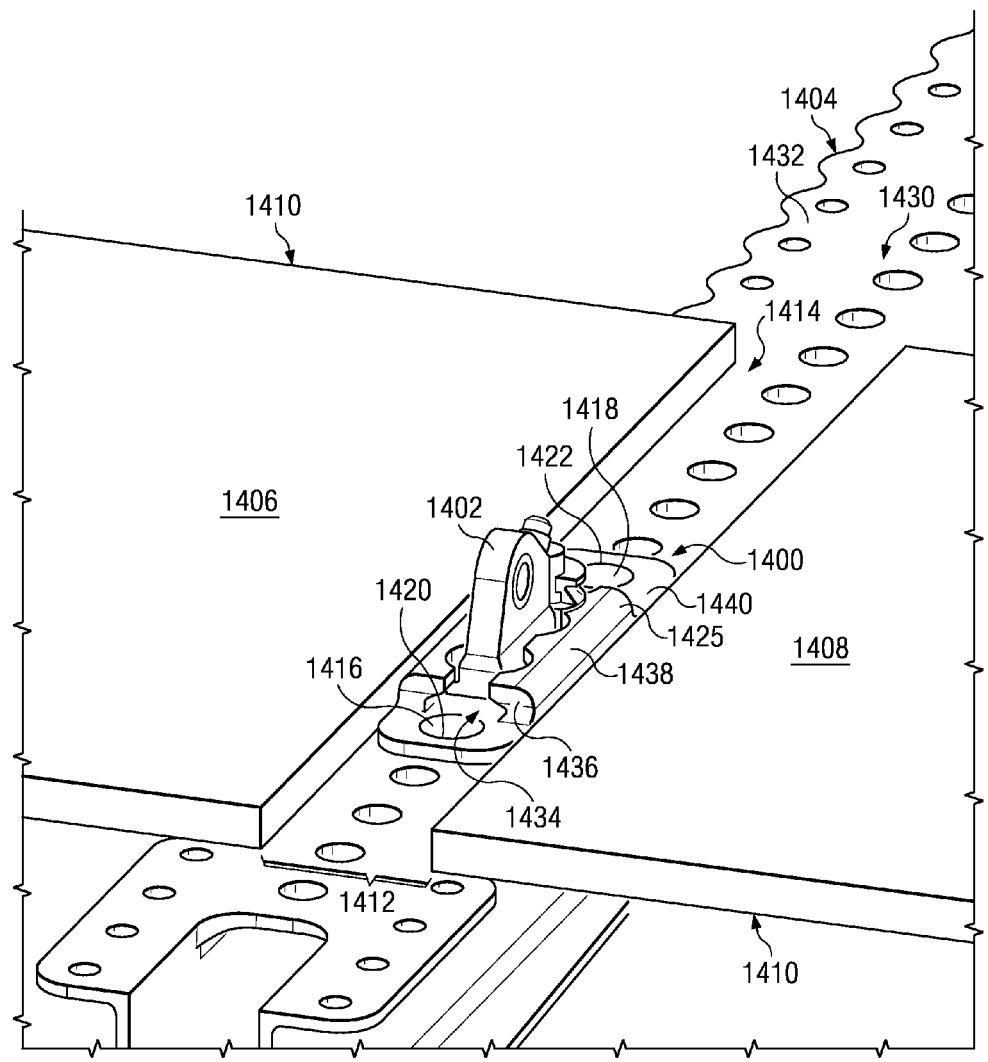
FIG. 15 is a perspective view of an attachment system, an adapter, and a track secured to each other in accordance with an advantageous embodiment.

With reference now to FIG. 15, a perspective view of an attachment system, an adapter, and a track secured to each other is depicted in accordance with an advantageous embodiment.

Figure 16:
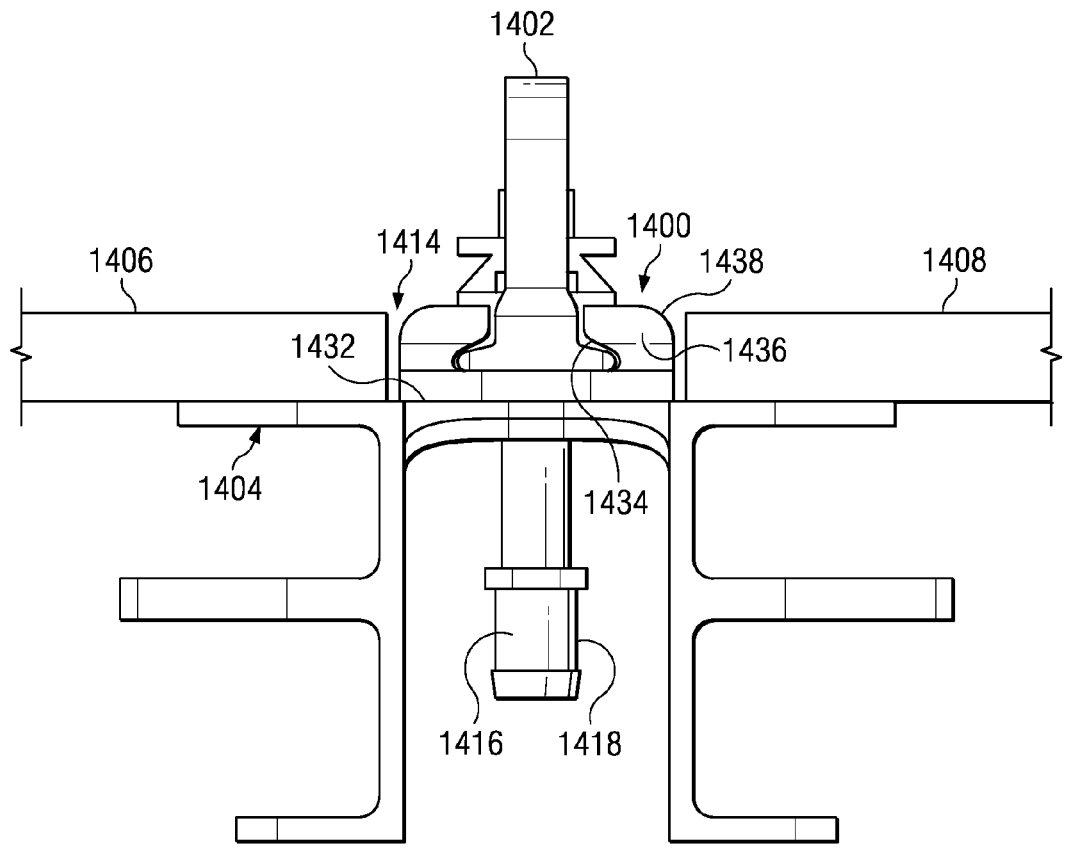
FIG. 16 is an end view of an adapter, an attachment system, and a track secured to each other in accordance with an advantageous embodiment.

With reference now to FIG. 16, an end view of an adapter, an attachment system, and a track secured to each other is depicted in accordance with an advantageous embodiment. In this view, attachment system 1402 may be secured within channel 1434 of adapter 1400. Further, adapter 1400 may be secured to track 1404 by fasteners 1416 and 1418 in this illustrative example.

Figure 17:
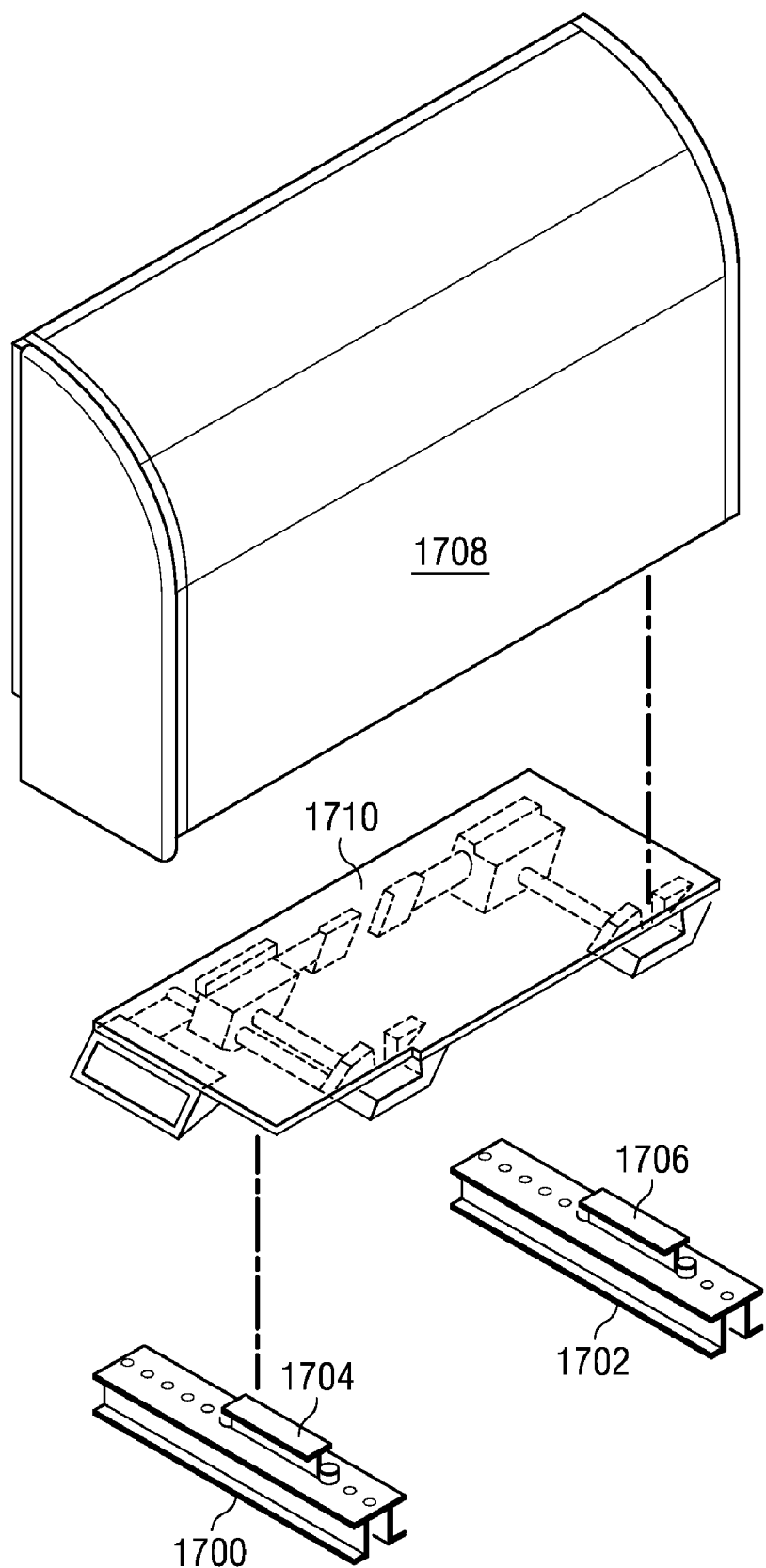
FIG. 17 is a diagram illustrating a latch system in accordance with an advantageous embodiment.

With reference now to FIG. 17, a diagram illustrating a latch system is depicted in accordance with an advantageous embodiment. In this example, track 1700 and track 1702 may be examples of track 1000 in FIG. 10. Adapter 1704 and adapter 1706 may be an example of one implementation of adapter 400 in FIG. 4. Doghouse 1708 may be an example of a monument or other structure that may be attached to track 1700 and 1702 through adapters 1704 and 1706.

In this illustrative example, latch system 1710 may be part of an attachment system for doghouse 1708. Latch system 1710 may allow for easy installation and removal of doghouse 1708. In other words, latch system 1710 may allow for easy securing and removal of doghouse 1708 from adapter 1704 and adapter 1706.

Latch system 1710 may be attached to doghouse 1708. Latch system 1710 may attach to and/or be released from adapter 1704 and adapter 1706 by manipulating latch system 1710. Of course, latch system 1710 may be employed with other types of objects other than doghouse 1708. For example, without limitation, latch system 1710 may be applied to a magazine rack, a cabinet, or some other suitable object.

Figure 18:
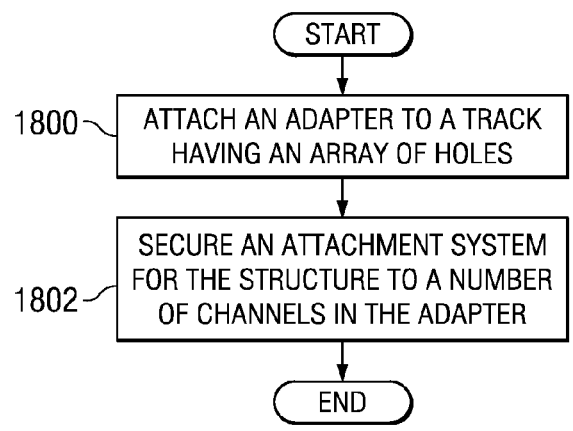
FIG. 18 is a flowchart of a process for installing a structure in accordance with an advantageous embodiment.

With reference now to FIG. 18, a flowchart of a process for installing a structure is depicted in accordance with an advantageous embodiment. The process may begin by attaching an adapter to a track having an array of holes (operation 1800). The process may then secure an attachment system for the structure to a number of channels in the adapter (operation 1802), with the process terminating thereafter. In some advantageous embodiments, the attachment system may be secured to the adapter prior to securing the adapter to the track.

Thus, the different advantageous embodiments may provide a method and apparatus for securing structures to tracks. In the different advantageous embodiments, an adapter may have an elongate planar member with a first side and a second side. The elongate planar member also may have a number of holes. The first side of the elongate planar member may be capable of being secured to a track having a substantially planar surface with an array of holes.

Further, the elongate planar member may have a number of flanges extending from the second side. A number of channels may be present at the ends of the number of flanges. Each channel may have a bottom, a first wall, and a second wall. Each wall may have a lip that extends towards a centerline associated with a channel.

With the different advantageous embodiments, structures having an attachment system configured for one type of track may be used with other types of tracks. The different advantageous embodiments may increase the selections and/or potential structures that may be used in a passenger cabin through the use of adapters as described above.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to a passenger cabin for use in an aircraft, other advantageous embodiments may be implemented in other types of objects.

For example, without limitation, the object may be selected from one of a mobile platform, a stationary platform, a land-based structure, an aquatic-based structure, a space-based structure, an aircraft, a surface ship, a tank, a personnel carrier, a train, a spacecraft, a space station, a submarine, an automobile, a power plant, a manufacturing facility, and a building.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an elongate planar member having a first side, a second side, and a at least two holes, wherein the first side is opposite to the second side and wherein the first side is configured to be secured to a track, wherein the track has a substantially planar surface with a number of track holes and is configured to receive the elongate member and to secure the elongate member by at least two pins inserted into the at least two holes and a corresponding portion of the track holes;
a number of flanges extending from the second side of the elongate planar member; and
a number of channels at ends of the number of flanges, wherein each channel in the number of channels has a bottom, a first wall, and a second wall, wherein the first wall has a first lip and the second wall has a second lip, wherein the first lip and the second lip extend towards a centerline of an associated channel in the number of channels.

2. The apparatus of claim 1 further comprising:
an aircraft structure having an attachment system configured to be secured to at least a portion of the number of channels.

3. The apparatus of claim 2, wherein the aircraft structure is a seat.

4. The apparatus of claim 3, wherein the monument is selected from one of a closet, a dog house, and a lavatory.

5. The apparatus of claim 2, wherein the aircraft structure is a monument.

6. The apparatus of claim 2, wherein the attachment system comprises:
a latch system configured to be connected to the aircraft structure and to at least the portion of the number of channels.

7. The apparatus of claim 1 further comprising:
the track, wherein the track is configured to be secured to a floor structure in a passenger cabin.

8. The apparatus of claim 7 further comprising:
a number of fasteners securing the elongate planar member to the track using the number of holes and the array of holes.

9. The apparatus of claim 1, wherein the number of channels has a centerline.

10. The apparatus of claim 1, wherein a centerline of the elongate planar member is offset and substantially parallel to a centerline of the number of channels.

11. The apparatus of claim 1, wherein the each of the number of channels have a C shape.

12. The apparatus of claim 1, wherein the elongate planar member is manufactured from a material selected from one of steel, aluminum, titanium, and a composite material.

13. The apparatus of claim 1, wherein the track is located in the passenger cabin for an object selected from one of a mobile platform, a stationary platform, a land-based structure, an aquatic-based structure, a space-based structure, an aircraft, a surface ship, a tank, a personnel carrier, a train, a spacecraft, a space station, a submarine, an automobile, a power plant, a manufacturing facility, and a building.

14. An adaptor system for attaching structures to a floor of an aircraft comprising:
an elongate planar member having a first side, a second side, and a number of holes, wherein the first side is opposite to the second side, wherein the first side is configured to be secured to a track having a substantially planar surface with an array of holes, and wherein the elongate planar member is manufactured from a material selected from one of steel, aluminum, titanium, and a composite material;

a number of flanges extending from the second side of the elongate planar member;

a number of channels at ends of the number of flanges, wherein each channel in the number of channels has a bottom, a first wall, a second wall, and a C shape, wherein the first wall has a first lip and the second wall has a second lip, wherein the first lip and the second lip extend towards a centerline of an associated channel in the number of channels, and wherein a centerline of the elongate planar member is offset and substantially parallel to a centerline of the number of channels;

a structure having an attachment system configured to be secured to at least a portion of the number of channels, wherein the structure is selected from one of a seat and a monument, wherein the monument is selected from one of a closet, a dog house, and a lavatory, and wherein the attachment system includes a latch system configured to be connected to the structure and to at least the portion of the number of channels;

the track, wherein the track is configured to be secured to a floor structure in the cabin; and a number of fasteners securing the elongate planar member to the track using the number of holes and the array of holes.

15. The adaptor system of claim 14, wherein the track is located in the cabin for an object selected from one of a mobile platform, a stationary platform, a land-based structure, an aquatic-based structure, a space-based structure, an aircraft, a surface ship, a tank, a personnel carrier, a train, a spacecraft, a space station, a submarine, an automobile, a power plant, a manufacturing facility, and a building.

16. A method for installing a structure, the method comprising:

attaching an adapter to a track having an array of holes, wherein the adaptor comprises an elongate planar member having a first side, a second side, and a number of holes, wherein the first side is opposite to the second side and wherein the first side is configured to be secured to the track having a substantially planar surface with the array of holes; a number of flanges extending from the second side of the elongate planar member; and a number of channels at ends of the number of flanges, wherein each channel in the number of channels has a bottom, a first wall, and a second wall, wherein the first wall has a first lip and the second wall has a second lip, wherein the first lip and the second lip extend towards a centerline of an associated channel in the number of channels; and securing an attachment system for the structure to the number of channels for the adapter.

17. The method of claim 16, wherein the structure is a seat.

18. The method of claim 16, wherein the structure is a monument.

19. The method of claim 16, wherein the attachment system comprises:

a latch system configured to be connected to the structure and to at least a portion of the number of channels.

20. The method of claim 16, wherein the track is configured to be secured to a floor structure in an aircraft cabin.

21. A method for installing a structure in an aircraft cabin, the method comprising:

attaching an adapter to a track having an array of holes, wherein the adaptor comprises an elongate planar member having a first side, a second side, and a number of holes, wherein the first side is opposite to the second side and wherein the first side is configured to be secured to the track having a substantially planar surface with the array of holes; a number of flanges extending from the second side of the elongate planar member; and a number of channels at ends of the number of flanges, wherein each channel in the number of channels has a bottom, a first wall, and a second wall, wherein the first wall has a first lip and the second wall has a second lip, wherein the first lip and the second lip extend towards a centerline of an associated channel in the number of channels and wherein the track is configured to be secured to a floor structure in the aircraft cabin; and securing an attachment system for the structure to the number of channels for the adapter, wherein the structure is selected from one of a seat and a monument and wherein the attachment system comprises a latch system configured to be connected to the aircraft structure and to at least a portion of the number of channels.

* * * * *